(12) United States Patent
Campbell et al.

(10) Patent No.: US 9,109,333 B2
(45) Date of Patent: Aug. 18, 2015

(54) HOPPER INSERT FOR ASPHALT PAVING MACHINE

(75) Inventors: Thomas R. Campbell, Ooltewah, TN (US); David Swearingen, Ooltewah, TN (US)

(73) Assignee: Roadtec, Inc., Chattanooga, TN (US)

( * ) Notice: Subject to any disclaimer, the term of this patent is extended or adjusted under 35 U.S.C. 154(b) by 554 days.

(21) Appl. No.: 13/525,455

(22) Filed: Jun. 18, 2012

(65) Prior Publication Data
US 2013/0010565 A1 Jan. 10, 2013

Related U.S. Application Data

(60) Provisional application No. 61/571,894, filed on Jul. 7, 2011.

(51) Int. Cl.
*E01C 19/48* (2006.01)
*B65G 11/02* (2006.01)
*B65G 11/20* (2006.01)

(52) U.S. Cl.
CPC .............. *E01C 19/48* (2013.01); *B65G 11/026* (2013.01); *B65G 11/206* (2013.01); *E01C 2301/02* (2013.01)

(58) Field of Classification Search
CPC ........................................................ E01C 19/48
USPC ...................................... 193/2 R, 3
See application file for complete search history.

(56) References Cited

U.S. PATENT DOCUMENTS

| | | | |
|---|---|---|---|
| 259,529 A * | 6/1882 | Gorham et al. ................ 414/345 |
| 1,281,640 A * | 10/1918 | Noteman .................... 280/47.34 |
| 2,690,827 A * | 10/1954 | Wiggins ............................ 193/3 |
| 2,762,506 A | 9/1956 | Fine |
| 3,047,125 A | 7/1962 | Schreyer |
| 3,365,049 A | 1/1968 | Raab |
| 3,396,644 A | 8/1968 | Banks |
| 3,399,466 A | 9/1968 | Hartley |
| 3,489,296 A | 1/1970 | Snow, III |
| 3,967,912 A | 7/1976 | Parker |
| 3,997,277 A | 12/1976 | Swisher, Jr. et al. |
| 5,401,115 A | 3/1995 | Musil et al. |
| 5,722,790 A | 3/1998 | Spray |
| 6,082,059 A | 7/2000 | Loomans |
| 6,193,437 B1 | 2/2001 | Heims |
| 6,390,461 B1 | 5/2002 | Vitko, Jr. et al. |
| 2007/0235509 A1 * | 10/2007 | Townsend .................. 229/117.3 |
| 2010/0239370 A1 | 9/2010 | Hill et al. |

* cited by examiner

*Primary Examiner* — David Sorkin
(74) *Attorney, Agent, or Firm* — Chambliss, Bahner & Stophel, P.C.

(57) ABSTRACT

A hopper insert for the hopper of a paving machine is installed above a hopper conveyor that conveys asphalt material in a hopper conveying direction. The hopper insert has a front end and a rear end and a plurality of walls that together define an opening adjacent to the hopper conveyor. The opening to the hopper conveyor increases in width from front end of the hopper insert to the rear end.

13 Claims, 7 Drawing Sheets

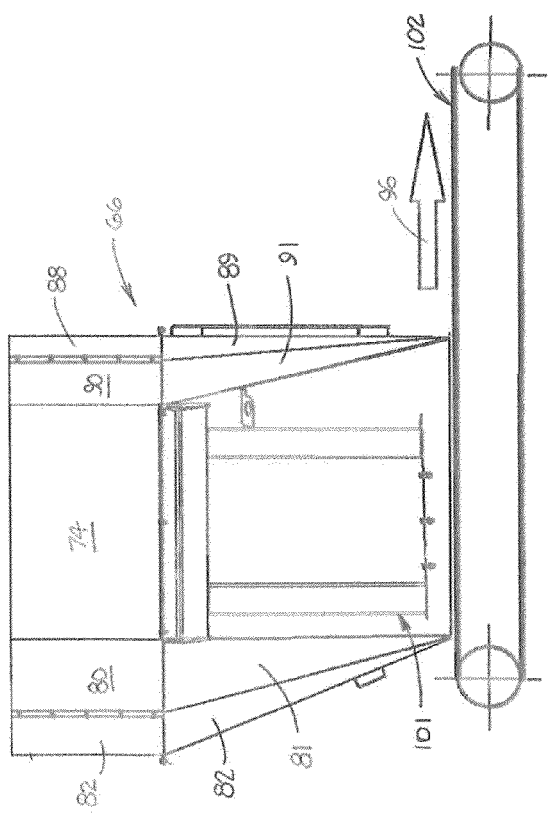
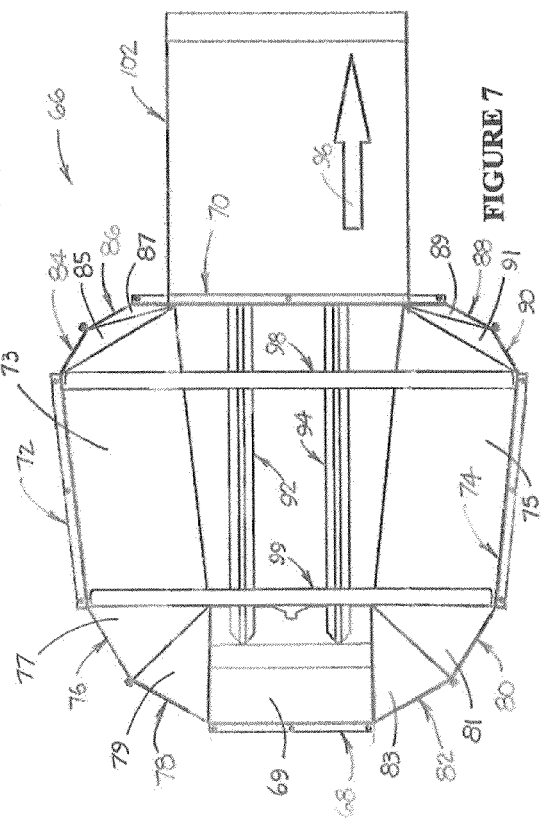

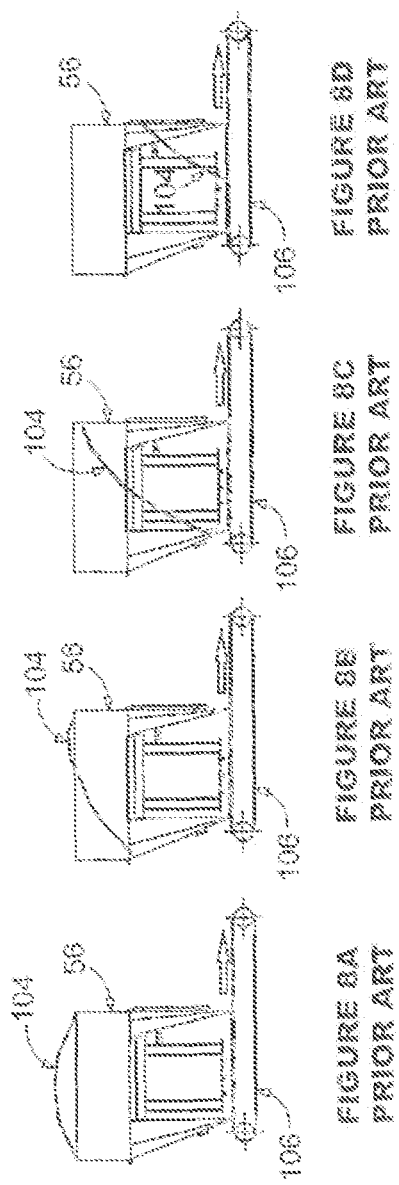
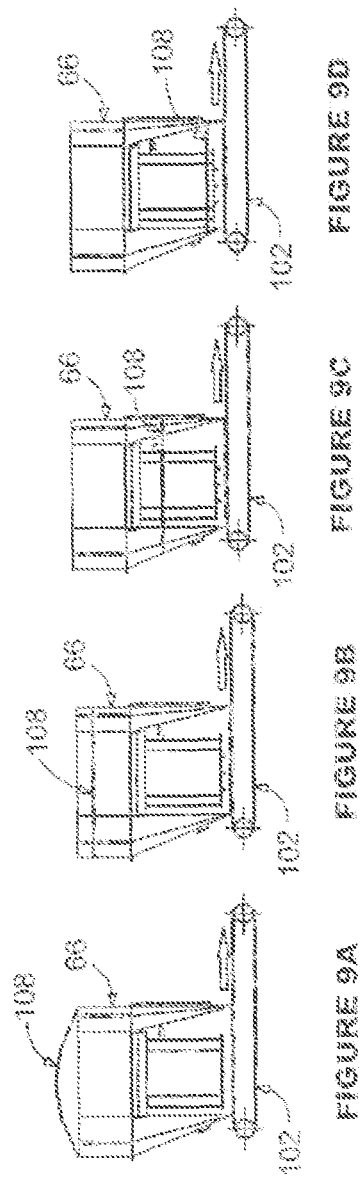

HOPPER INSERT FOR ASPHALT PAVING MACHINE

CROSS-REFERENCE TO RELATED APPLICATION

This application claims the benefit of U.S. Provisional Patent Application No. 61/571,894, which was filed on Jul. 7, 2011.

FIELD OF THE INVENTION

The present invention relates generally to asphalt paving machines, and more particularly, to an insert for the hopper of a paving machine that facilitates remixing of asphalt materials to overcome the problem of segregation and uneven temperature distribution.

BACKGROUND OF THE INVENTION

Paving of a roadway with asphalt material is generally carried out by a paving machine that is supplied with asphalt materials by a number of supply trucks and/or a material transfer vehicle. The paving machine is self-propelled and driven by a wheeled or tracked drive system. In a common type of paving machine, an integral hopper is located at the front end of the machine to receive asphalt material from a truck or material transfer vehicle, and a conveyor system typically comprised of one or more slat conveyors located below the hopper transfers the asphalt material from the hopper to a transverse distributing auger that is mounted near the rear of the machine. The asphalt material is deposited onto and across the roadway or other surface to be paved by the distributing auger. A floating screed located at the rear end of the machine behind the distributing auger compacts the asphalt material and forms the asphalt mat.

Because paving machines are often supplied with asphalt materials by dump trucks, the front wall of a typical integral hopper is low enough to allow a dump truck to dump directly into the hopper. Although the sidewalls of an integral hopper are generally higher than the front wall, the front wall height of the integral hopper is a limiting factor in hopper capacity. However, when the paving machine is supplied with asphalt materials using a material transfer vehicle which drops asphalt into the hopper from a higher point (than a dump truck), the truck-loading front wall limitation is removed. Hopper inserts are known to be installed in the integral hopper of the paving machine for increasing the capacity of the machine, especially when it is to be supplied with asphalt materials by a material transfer vehicle.

Asphalt material is comprised of an asphaltic binder and aggregates of various sizes, including both coarse and fine aggregate materials. When asphalt material is properly produced in an asphalt production plant, it is generally homogeneous in the sense that the various aggregate sizes are evenly distributed throughout the mixture. However, paving is almost always carried out some distance from the production plant. Consequently, it is frequently necessary to transport the asphalt material from its place of origin to a paving machine at the paving site. Typically, the asphalt material is transported in dump trucks, and the loading of such material into the dump beds is accomplished by dropping the material from an overhead hopper or silo into the truck bed. Such loading operations, as well as the vibrations and jostling associated with vehicular transport tend to separate the asphalt materials into coarse and fine fractions in the truck bed. Furthermore, the time of transport tends to cause the asphalt material on the top and sides of the load in the truck bed to cool, thus resulting in uneven heat distribution throughout the mixture. Although some material transfer vehicles include mechanisms for re-mixing the asphalt material, segregation and temperature variation in the asphalt material that occurs during transport of the asphalt to the paving machine continue to be problems.

Conventional asphalt paving machines (and conventional hopper inserts) do not eliminate the problems of segregation and uneven heat distribution. Furthermore, they may even exacerbate the problem, because in the conventional hopper (and the conventional hopper insert), asphalt material at the front of the hopper or hopper insert is generally conveyed to the transverse distributing auger before asphalt material at the rear of the hopper or hopper insert. It would be desirable therefore if a hopper insert could be provided that would tend to remix the asphalt materials to obtain the desired size homogeneity and even temperature distribution.

Advantages Of The Invention

Among the advantages of a preferred embodiment of the invention is that it provides a hopper insert for a paving machine that facilitates the creation of a more homogeneous mixture of asphalt materials, by both aggregate size and temperature distribution, passing through the conveyor tunnel to the distributing auger. Other advantages and features of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

Various terms are specifically defined herein. These terms are to be given their broadest possible construction consistent with such definitions, as follows:

The term "asphalt material(s)" refers to a bituminous paving mixture that is comprised of an asphaltic binder and any of various aggregate materials, and which is used for paving purposes.

The terms "asphalt paving machine", "paving machine" and similar terms refer to a finishing machine for applying asphalt material to form an asphalt mat on a roadway, parking lot or similar surface.

The term "asphalt mat" refers to a layer of asphalt material such as is applied by an asphalt paving machine to produce a roadway, parking lot or similar surface.

The term "paving direction", when used in describing the operation of a paving machine or the relative position of a paving machine or a component of a paving machine, refers to the direction of advance of the paving machine as the paving operation is carried out.

The term "hopper conveyor" refers to a single conveyor or to multiple parallel conveyors which are adapted to convey asphalt material from the hopper of a paving machine, or a hopper insert mounted therein, to the distributing auger of the paving machine.

The term "hopper conveying direction", when used in describing the operation of a hopper or hopper insert of a paving machine or the relative position of a hopper, hopper insert or component thereof, refers to the direction that asphalt material is conveyed from the hopper towards the distributing auger as the paving operation is carried out. The hopper conveying direction is generally 180° from the paving direction.

The terms "front" and "front end" of the paving machine refer to the end of the machine that leads in the paving direction. When referring to a component of the paving machine, the terms "front" and "front end" refer to that portion of the component that is nearer the front end of the paving machine.

The terms "rear" and "rear end" of the paving machine refer to the end opposite the front end. When referring to a component of the paving machine, the terms "rear" and "rear end" refer to that portion of the component that is nearer the rear end of the paving machine.

The terms "forward" and "in front or", as used herein to describe a relative position or direction on or in connection with a paving machine, refer to a relative position towards the front end of the machine.

The terms "rearward", "behind" and "rearwardly", as used herein to describe a relative position or direction on or in connection with a paving machine, refer to a relative position or direction towards the rear end of the machine.

The terms "downward" and "downwardly", as used herein to describe a relative direction on or in connection with a paving machine, refer to a direction towards the roadway that is being paved with the machine.

The terms "lower" and "below", as used herein to describe the relative position of a component or a portion of a component of a paving machine, refer to that component or that portion of a component that is in the downward direction.

The terms "upward" and "upwardly", as used herein to describe a relative direction on or in connection with a paving machine, refer to a direction away from the roadway that is being paved with the machine.

The terms "upper" and "above", as used herein to describe the relative position of a component or a portion of a component of the paving machine, refer to that component or that portion of a component that is in the upward direction.

The term "right", when used herein to describe a relative position or direction on or in connection with a paving machine, a component thereof, or a hopper insert for a paving machine, refers to the right side of the machine, component or insert from the perspective of an observer facing the paving direction.

The term "left", when used herein to describe a relative position or direction on or in connection with a paving machine, a component thereof, or a hopper insert for a paving machine, refers to the left side of the machine, component or insert from the perspective of an observer facing the paving direction.

The term "vertical", when used herein to describe a relative orientation of the walls of a hopper insert or a portion thereof, refers to a position or direction along a line that is generally perpendicular to the paving direction and to the plane of the roadway or other surface that is being paved by the paving machine.

The term "width", when used herein to describe a dimension of a hopper insert, or a component thereof, refers to a dimension that is measured in a direction perpendicular to the paving direction and parallel to the plane of the roadway or other surface that is being paved by the paving machine.

SUMMARY OF THE INVENTION

The invention comprises a hopper insert that is adapted to be installed in the hopper of a paving machine above a hopper conveyor that conveys asphalt material in a hopper conveying direction. The hopper insert has a front end and a rear end, and comprises a plurality of walls that together define an opening adjacent to the hopper conveyor. The opening defined by the plurality of walls of the hopper insert increases in width from the front end of the hopper insert to the rear end.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which:

FIG. 6 is a side view of the hopper insert of FIG. 4, showing a schematic illustration of a hopper conveyor of a conventional paving machine above which the insert may be mounted.

FIG. 7 is a top view of the hopper insert and conveyor of FIG. 6.

FIG. 8A is a side view of a conventional hopper insert such as is shown in FIG. 3, illustrating a level of asphalt material in the hopper insert that is 100% full.

FIG. 8B is a side view of a conventional hopper insert such as is shown in FIGS. 3 and 8A, showing a level of asphalt material in the hopper insert that is 80% full.

FIG. 8C is a side view of a conventional hopper insert such as is shown in FIGS. 3, 8A and 8B; showing a level of asphalt material in the hopper insert that is 40% full.

FIG. 8D is a side view of a conventional hopper insert such as is shown in FIGS. 3, 8A, 8B and 8C, showing a level of asphalt material in the hopper insert that is 10% full.

FIG. 9A is a side view of a hopper insert such as is shown in FIGS. 4-7, illustrating a level of asphalt material in a the hopper insert that is 100% full.

FIG. 9B is a side view of a hopper insert such as is shown in FIGS. 4-7 and 9A, showing a level of asphalt material in the hopper insert that is 80% full.

FIG. 9C is a side view of a hopper insert such as is shown in FIGS. 4-7, 9A and 9B, showing a level of asphalt material in the hopper insert that is 40% full.

FIG. 9D is a side view of a hopper insert such as is shown in FIGS. 4-7, 9A, 9B and 9C, showing a level of asphalt material in the hopper insert that is 10% full.

DESCRIPTION OF THE PREFERRED EMBODIMENT OF THE INVENTION

Figure 1:
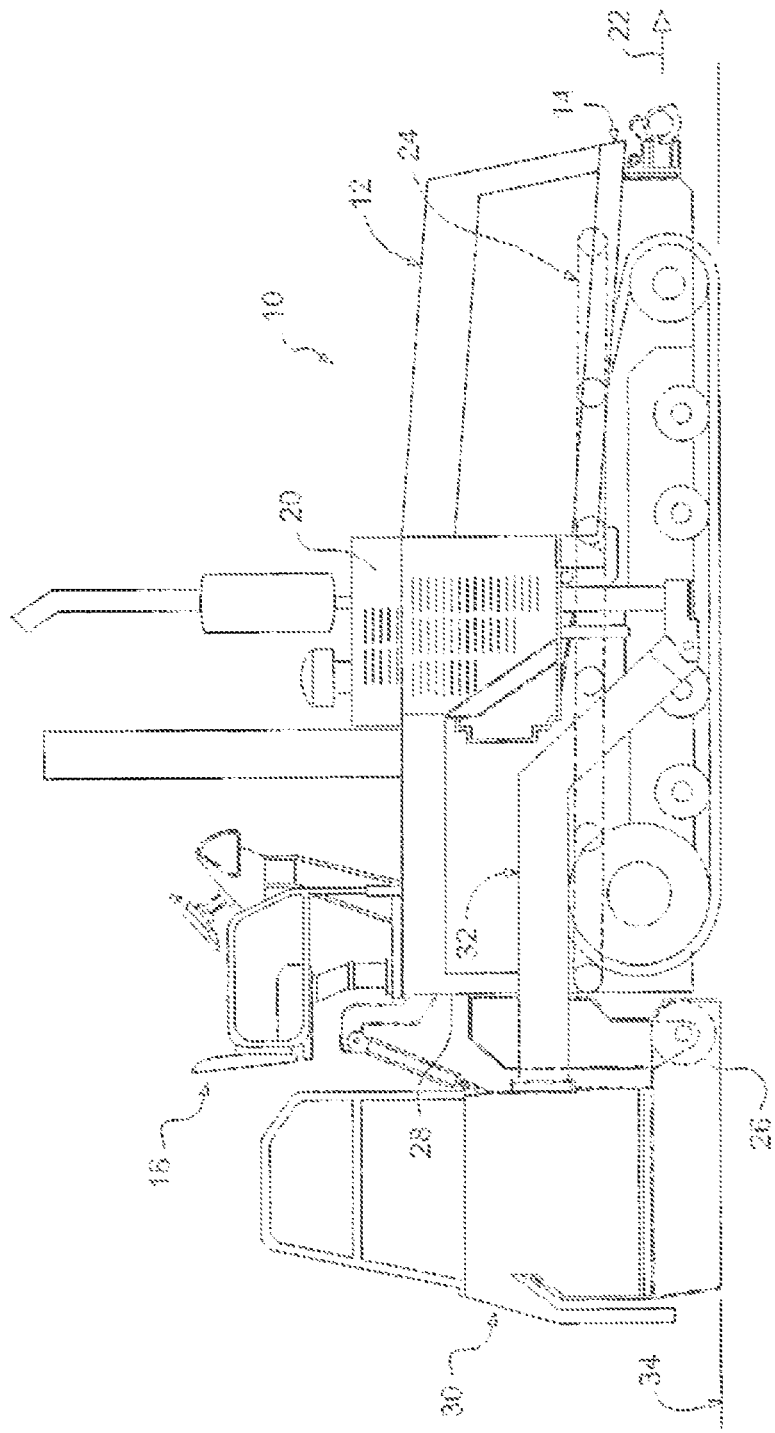
FIG. 1 is a side view of a conventional paving machine to which a preferred embodiment of the invention may be mounted.

Referring now to the drawings, FIG. 1 illustrates conventional paving machine 10, which includes hopper 12 at its front end 14 for receiving asphalt material from a dump truck or other material transfer vehicle. Paving machine 10 also includes operator's station 16, and track drive system 18 that is driven by engine 20 so as to move the paving machine during the paving operation in the paving direction indicated by arrow 22. The bottom of hopper 12 is open, exposing hopper conveyor 24 mounted under the hopper. The conveyor conveys asphalt material from hopper 12 through a conveyor tunnel under the engine and operator's station to transverse distributing auger 26 that is located near rear end 28 of paving machine 10. Transverse distributing auger 26 is adapted to distribute the asphalt material received from the hopper across the width of the roadway or lane to be paved. Floating screed 30 is attached to the paving machine by a pair of tow arms, one of which, tow arm 32, is illustrated in FIG. 1. Screed 30 serves to compact the asphalt material and form the asphalt mat 34.

Figure 2:
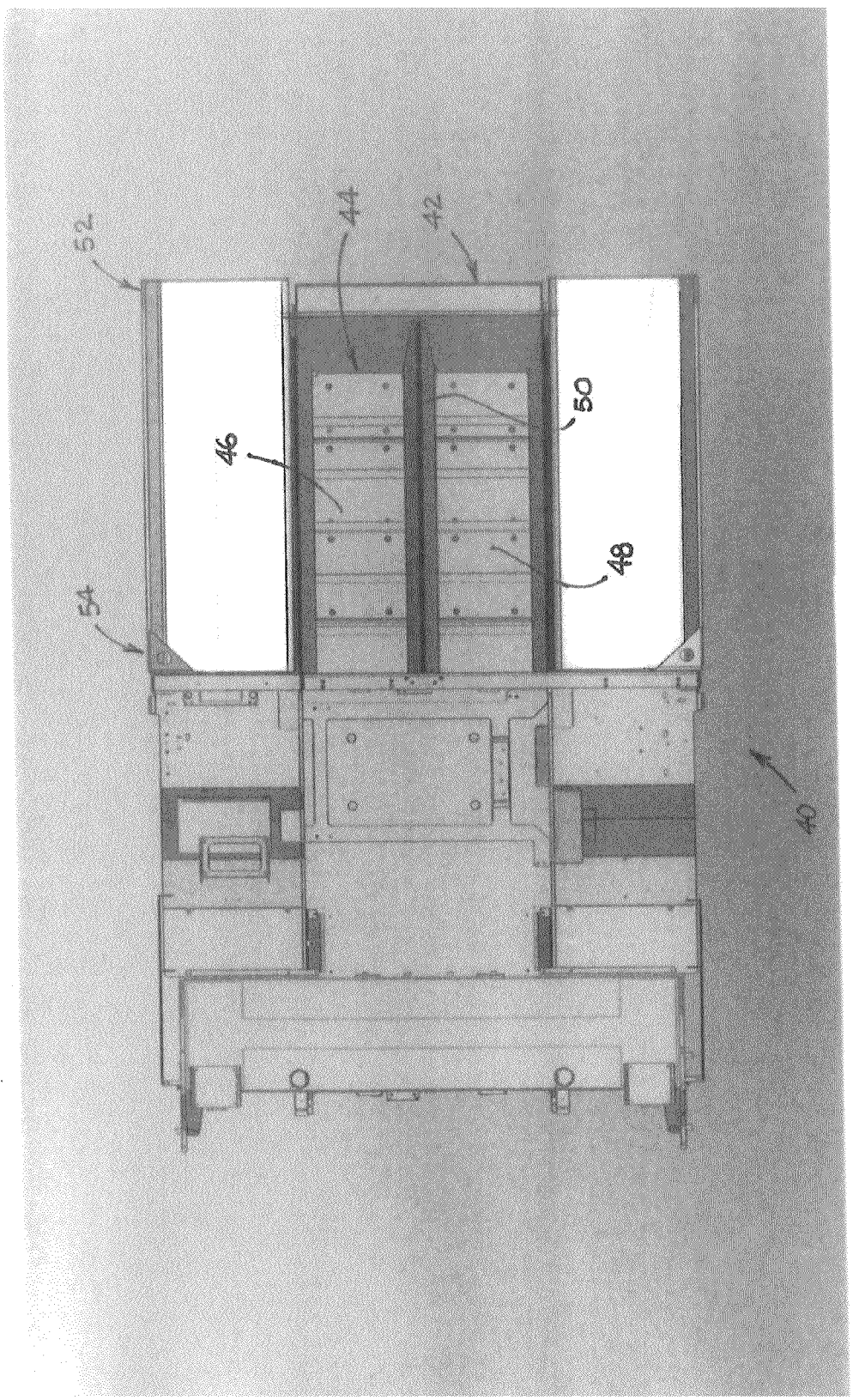
FIG. 2 is a schematic top view of a conventional paving machine such as is shown in FIG. 1.

As shown schematically in FIG. 2, paving machine 40, which is similar to paving machine 10, includes conventional hopper 42 having rectangular opening 44 in the bottom. Beneath the hopper opening is located a hopper conveyor comprising parallel slat conveyors 46 and 48. Central divider 50 extends from the front end 52 of hopper 42 through the conveyor tunnel. This divider serves to keep the asphalt material from falling between the two parallel slat conveyors and to direct the asphalt material onto slat conveyor 46 and slat conveyor 48. Because the width of the opening in the bottom of hopper 42 onto slat conveyors 46 and 48 is the same at front end 52 and rear end 54 of hopper 42, larger-sized aggregate materials that fall to the corners at the front end of the hopper are pulled straight back by the slat conveyors, thus creating a stream of non-homogenous asphalt material along the outsides of the slat conveyors and continuing through the conveyor tunnel.

Figure 3:
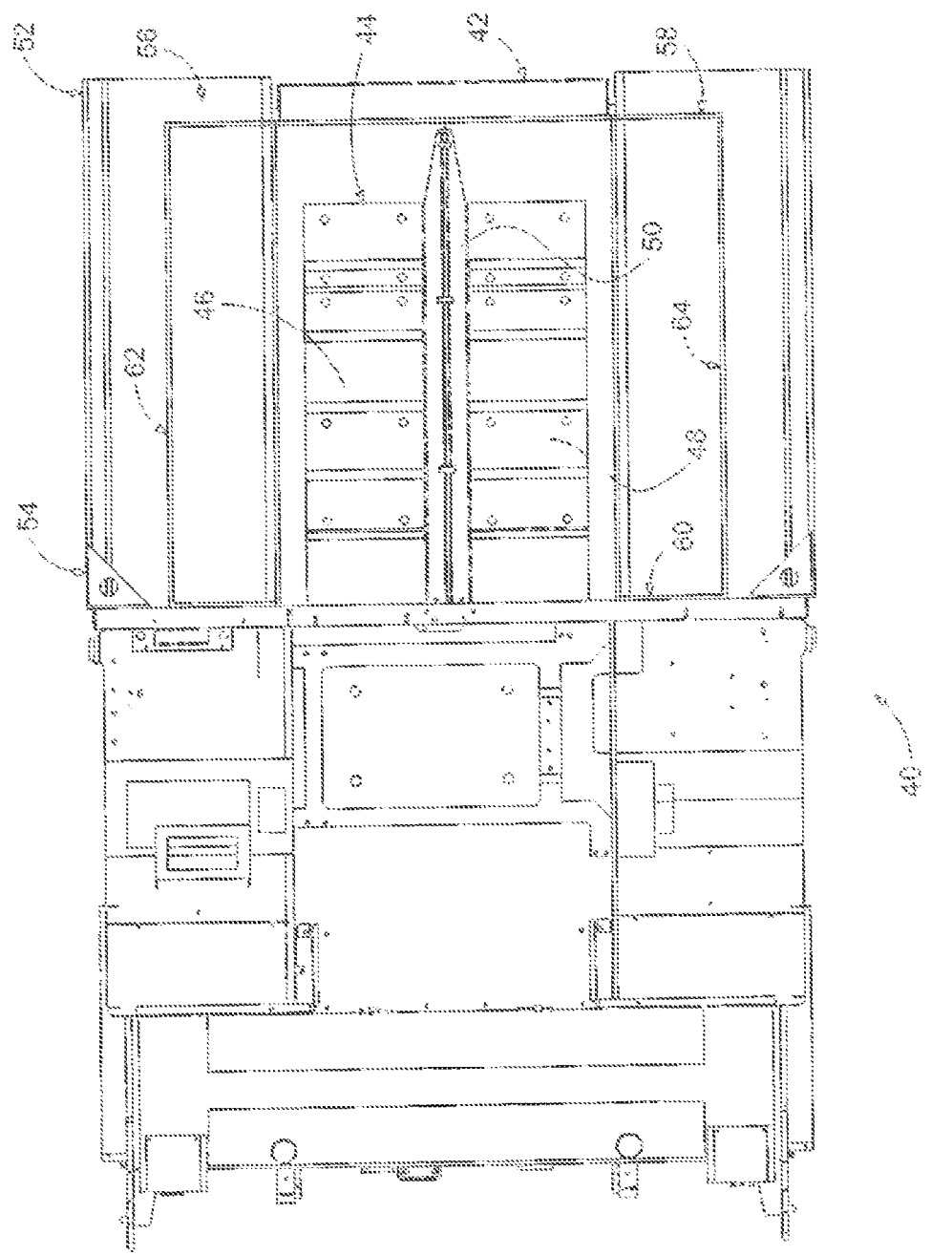
FIG. 3 is a schematic top view of a conventional paving machine such as is shown in FIGS. 1 and 2 which is equipped with a conventional hopper insert.

FIG. 3 is a schematic illustration of paving machine 40, to which conventional hopper 56 insert is mounted. As described above, paving machine 40 includes conventional hopper 42 having a rectangular opening in the bottom. Beneath the hopper opening are located parallel slat conveyors 46 and 48. Central divider 50 extends from the front end 52 of hopper 42 through the conveyor tunnel. This divider serves to keep the asphalt material from falling between the two parallel slat conveyors and to direct the asphalt material onto slat conveyor 46 and slat conveyor 48. Mounted in hopper 42 is conventional hopper insert 56, which includes front wall 58, rear wall 60, left sidewall 62 and right sidewall 64. Hopper insert 56 serves to increase the asphalt material capacity of the paving machine. Although hopper insert 56 is shown in FIG. 3 as having vertical walls, other conventional hopper inserts may have walls that diverge outwardly as they extend upwardly from the hopper. However, adjacent walls of conventional hopper inserts form right angles, whether they are vertical, as shown in FIG. 3, or whether they diverge outwardly as they extend upwardly (not shown). Consequently, the width of the opening in the bottom of hopper insert 56 onto slat conveyors 46 and 48 is the same at front end 52 and rear end 54 of the hopper. Therefore, larger-sized aggregate materials that fall to the corners at the front end of the hopper insert are pulled straight back by the slat conveyors, thus creating a stream of non-homogenous asphalt material along the outsides of the slat conveyors and continuing through the conveyor tunnel. Furthermore, asphalt material from the front end of the conventional hopper insert is generally carried toward the distributing auger by the conveyor before asphalt material from the back end. This contributes to the delivery of asphalt materials of varying temperatures to the distributing auger as the hopper insert is unloaded. Thus, although hopper insert 56 increases the capacity of paving machine 40 for asphalt materials over that of a paving Machine without a conventional hopper insert (FIG. 2), it does not solve the segregation and temperature distribution problems associated with the conventional hopper.

Figure 4:
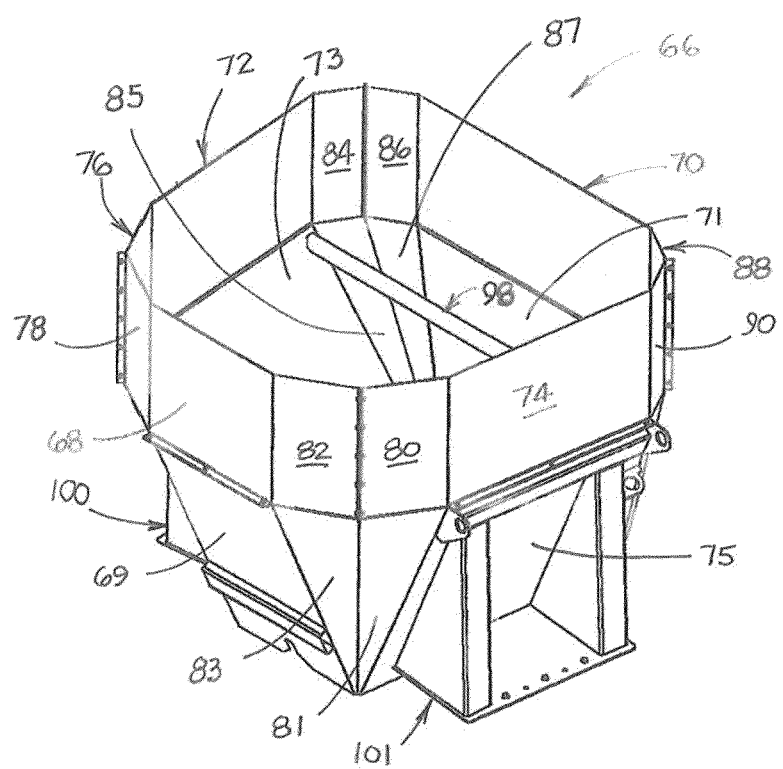
FIG. 4 is a perspective view of a preferred embodiment of the hopper insert which is described and claimed herein.
Figure 5:
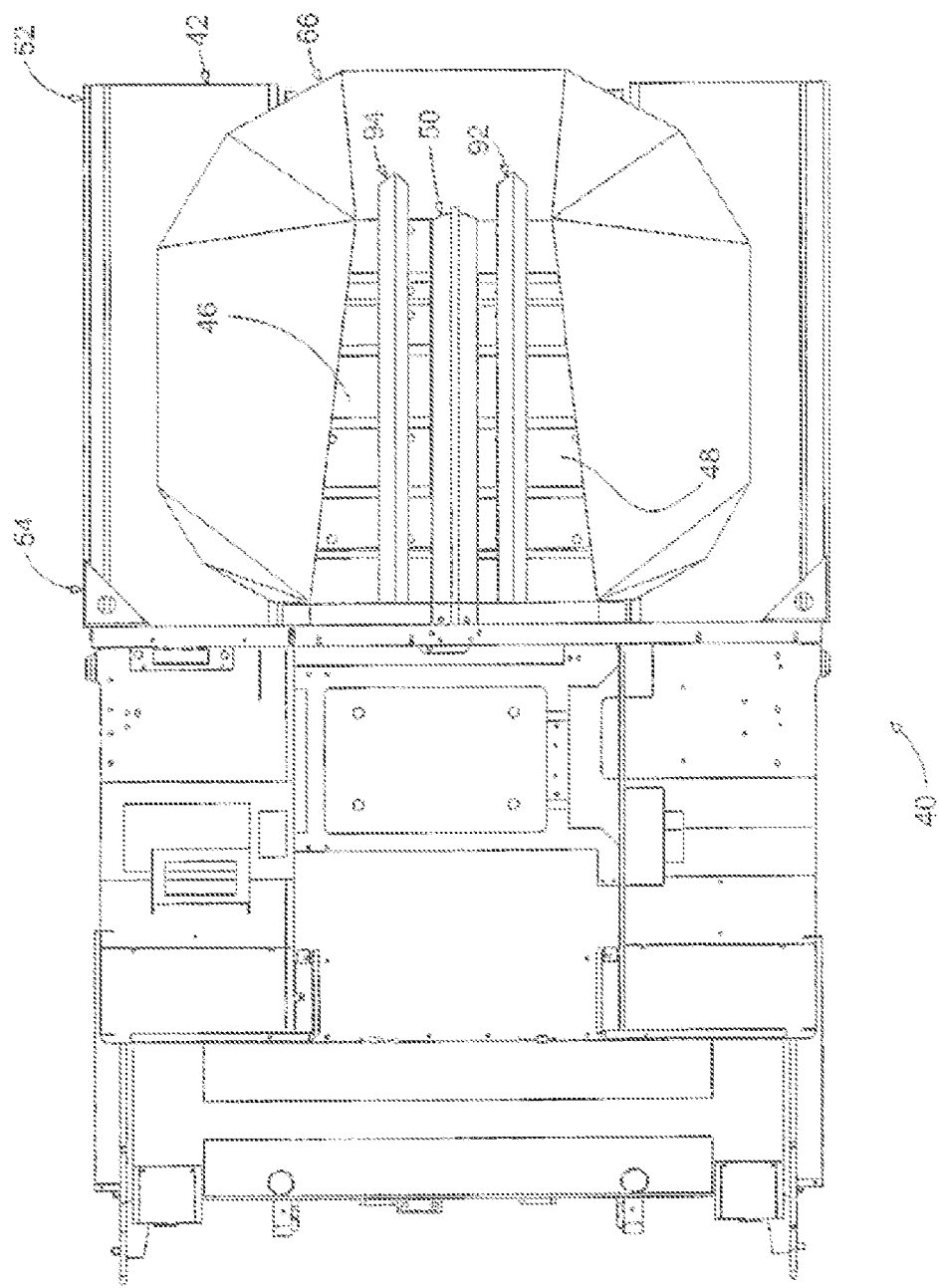
FIG. 5 is a schematic top view of a conventional paving machine such as is shown in FIGS. 1 and 2 which is equipped with the embodiment of the hopper insert that is shown in FIG. 4 (with the upper supports removed for clarity).

FIGS. 4-7 illustrate hopper insert 66 which is described and claimed herein. FIG. 4 shows the hopper insert only, and FIG. 5 shows hopper insert 66 installed in paving machine 40, which includes conventional hopper 42 having a rectangular opening in the bottom. Beneath the hopper opening are located parallel slat conveyors 46 and 48 which are adapted to convey asphalt material out of the hopper insert towards the distributing auger. Central divider 50, which extends from the front end 52 of hopper 42 through the conveyor tunnel, serves to keep the asphalt material from falling between the two parallel slat conveyors and to direct the asphalt material onto slat conveyor 46 and slat conveyor 48. Hopper insert 66 comprises a plurality of walls that together define an opening adjacent to the hopper conveyor.

As best shown in FIGS. 4 and 7, hopper insert 66 comprises an upper portion which includes a plurality of upper walls and a lower portion which includes a plurality of lower walls, each of which is associated with and extends downwardly from an upper wall. The upper walls are generally vertically oriented, and a plurality of the lower walls are angled with respect to their associated upper walls so as to form a generally funnel-shaped lower portion of the hopper insert. Preferably, the upper walls are arranged so that adjacent walls do not form right angles. Thus, hopper insert 66 includes upper front wall 68, and lower front wall 69 which depends from the bottom of the upper front wall and is angled towards the rear end of the paving machine. Upper rear wall 70 is substantially parallel to upper front wall 68, and lower rear wall 71 depends generally vertically downwardly from the bottom of upper rear wall 70, although in other embodiments of the invention, lower rear wall 71 could be angled towards the front of the paving machine. The hopper insert also includes right upper sidewall 72 and right lower sidewall 73 which depends from the bottom of right upper sidewall 72 and is angled towards the left side of the paving machine. Hopper insert 66 also includes left upper sidewall 74, which is not parallel to right upper sidewall 72. Left lower sidewall 75 depends downwardly from left upper sidewall 74 and is angled towards the right side of the paving machine. Preferably, a pair of upper panels cooperate to close the gap between the front end of right upper sidewall 72 and upper front wall 68, and a pair of lower panels cooperate to close the gap between the front end of right lower sidewall 73 and lower front wall 69. Thus, upper panels 76 and 78 are provided at the front right corner of hopper insert 66 between right upper sidewall 72 and upper front wall 68, and lower panels 77 and 79 depend downwardly from upper panels 76 and 78 respectively, and are angled generally towards the center of the hopper. It is also preferred that a pair of upper panels cooperate to close the gap between the front end of left upper sidewall 74 and upper front wall 68, and that a pair of lower panels cooperate to close the gap between the front end of left lower sidewall 75 and lower front wall 69. Thus, upper panels 80 and 82 are provided at the front left corner of hopper insert 66 between left upper sidewall 74 and upper front wall 68, and lower panels 81 and 83 depend downwardly from upper panels 80 and 82 respectively, and are angled generally towards the center of the hopper. It is also preferred that a pair of upper panels cooperate to close the gap between the rear end of right upper sidewall 72 and upper rear wall 70, and that a pair of lower panels cooperate to close the gap between the rear end of right lower sidewall 73 and lower rear wall 71. Thus, upper panels 84 and 86 are provided at the rear right corner of hopper insert 66 between right upper sidewall 72 and upper rear wall 70, and lower panels 85 and 87 depend downwardly from upper panels 84 and 86 respectively, and are angled generally towards the center of the hopper. It is also preferred that a pair of upper panels cooperate to close the gap between the rear end of left upper sidewall 74 and upper rear wall 70, and that a pair of lower panels cooperate to close the gap between the rear end of left lower sidewall 75 and lower rear wall 71. Thus, upper panels 88 and 90 are provided at the rear left corner of hopper insert 66 between left upper sidewall 74 and upper rear wall 70, and lower panels 89 and 91 depend downwardly from upper panels 88 and 90 respectively, and are angled generally towards the center of the hopper.

It is also preferred that a pair of parallel lower supports 92 and 94 be provided in the hopper insert, which lower supports are oriented in a direction parallel to hopper conveying direction 96, and that a pair of parallel upper supports 98 and 99 (not shown in FIG. 5) be provided that are oriented in a direction perpendicular to hopper conveying direction 96. Right lower frame 100 and left lower frame 101 provide support for the hopper insert in hopper 42. A schematic illustration of a conventional hopper conveyor (such as, for example, parallel slat conveyors 46 and 48) is shown at 102 in FIGS. 6 and 7.

As shown in FIGS. 5 and 7, the opening defined by the hopper insert walls to conveyor 102 increases in width from the front end of hopper insert 66 to the rear end. Preferably, the width at the bottom of lower front wall 69 is 33%-67% of the width at the bottom of lower rear wall 71. Most preferably, the width at the bottom of lower front wall 69 is about 50% of the width at the bottom of lower rear wall 71. Consequently, as larger-sized aggregate materials fall to the corners at the front end of hopper insert 66 and are pulled straight back by the slat conveyors, additional asphalt materials can fall onto the underlying hopper conveyor outside of the larger aggregate stream, thus creating a more homogenous mixture of asphalt material along the outsides of the hopper conveyor and continuing through the conveyor tunnel. By providing a wider opening to the underlying hopper conveyor at the rear end of the hopper insert, the mass flow rate of asphalt material to the distributing auger is also increased, and this increase in the mass flow rate reduces the opportunity for additional segregation as the asphalt material is conveyed, to the distributing auger.

FIGS. 8A-8D and 9A-9D illustrate the differences in the ways that asphalt materials are unloaded by the underlying hopper conveyor from conventional hopper insert 56 and preferred hopper insert 66. FIGS. 8A-8D show how upper level 104 of asphalt material in conventional hopper insert 56 declines as the hopper insert is unloaded by conveyor 106, and FIGS. 9A-9D show how upper level 108 of asphalt material in hopper insert 66 declines at the same rate of removal by conveyor 102. Thus, FIGS. 8A and 9A show upper levels 104 and 108 respectively, as the hopper inserts are 100% full and unloading begins. FIGS. 8B and 9B show upper levels 104 and 108 respectively, when unloading has proceeded until the hopper inserts are only 80% full. FIGS. 8C and 9C show upper levels 104 and 108 respectively, when unloading has proceeded until the hopper inserts are only 40% full, and FIGS. 8D and 9D show upper levels 104 and 108 respectively, when unloading has proceeded until the hopper inserts are only 10% full.

Although this description contains many specifics, these should not be construed as limiting the scope of the invention, but as merely providing illustrations of the presently preferred embodiment thereof, as well as the best mode contemplated by the inventors of carrying out the invention. The invention, as described herein, is susceptible to various modifications and adaptations, as would be understood by those having ordinary skill in the art to which the invention relates, and the same are intended to be comprehended within the meaning and range of equivalents of the appended claims.

What is claimed is:

1. A hopper insert that is adapted to be installed in the hopper of a paving machine above a hopper conveyor that conveys asphalt material in a hopper conveying direction, said hopper insert:
    (a) having a front end and a rear end;
    (b) comprising:
        (i) an upper portion that includes a plurality of generally vertically oriented upper walls;
        (ii) a generally funnel-shaped lower portion which includes a plurality of lower walls, each of which is associated with and extends downwardly from an upper wall, wherein a plurality of the lower walls are angled with respect to their associated upper walls;
        wherein the upper walls and the lower walls together define an opening into the hopper conveyor therebelow, said opening increasing in width from the front end of the hopper insert to the rear end.

2. The hopper insert of claim 1 wherein the width of the opening at the front end of the hopper insert is within the range of 33%-67% of the width of the opening at the rear end of the hopper insert.

3. The hopper insert of claim 1 wherein the width of the opening at the front end of the hopper insert is about 50% of the width of the opening at the rear end of the hopper insert.

4. The hopper insert of claim 1 wherein the upper walls are arranged so that adjacent upper walls do not form right angles.

5. The hopper insert of claim 1, wherein the upper portion comprises:
    (a) a front wall;
    (b) a rear wall that is substantially parallel to the front wall;
    (c) a right sidewall; and
    (d) a left sidewall that is not parallel to the right sidewall.

6. The hopper insert of claim 5 wherein the width of the opening at the front end of the hopper insert is within the range of 33%-67% of the width of the opening at the rear end of the hopper insert.

7. The hopper insert of claim 5 wherein the width of the opening at the front end of the hopper insert is about 50% of the width of the opening at the rear end of the hopper insert.

8. The hopper insert of claim 5, comprising:
(a) a pair of parallel lower supports which are oriented in a direction parallel to the hopper conveying direction;
(b) a pair of parallel upper supports which are oriented in a direction perpendicular to the hopper conveying direction.

9. A hopper insert that is adapted to be installed in the hopper of a paving machine above a hopper conveyor that conveys asphalt material in a hopper conveying direction, said hopper insert comprising a plurality of walls that together define an opening adjacent to the hopper conveyor that increases in width from the front end of the hopper insert to the rear end, wherein:
(a) said plurality of walls comprises:
  (i) a front wall;
  (ii) a rear wall that is substantially parallel to the front wall;
  (iii) a right sidewall; and
  (iv) a left sidewall that is not parallel to the right sidewall;
(b) said hopper insert comprises:
  (i) a plurality of upper walls;
  (ii) a plurality of lower walls, each of which is associated with and extends downwardly from an upper wall;
wherein a plurality of the lower walls are angled with respect to their associated upper walls so as to form a generally funnel-shaped lower portion of the hopper insert.

10. The hopper insert of claim 9, comprising:
(a) an upper front wall;
(b) a lower front wall which depends from the bottom of the upper front wall and is angled towards the rear end of the paving machine;
(c) an upper rear wall that is substantially parallel to the upper front wall;
(d) a lower rear wall that depends from the bottom of the upper rear wall;
(e) a right upper sidewall having a front end and a rear end;
(f) a right lower sidewall having a front end and a rear end, said right lower sidewall depending from the bottom of the right upper sidewall and being angled towards the left side of the paving machine;
(g) a left upper sidewall having a front end and a rear end, which left upper sidewall is not parallel to the right upper sidewall;
(h) a left lower sidewall having a front end and a rear end, said left lower sidewall depending downwardly from the left upper sidewall and being angled towards the right side of the paving machine.

11. The hopper insert of claim 10 wherein the lower rear wall depends generally vertically downwardly from the bottom of the upper rear wall.

12. The hopper insert of claim 10 which includes:
(a) a pair of upper panels that cooperate to close the gap between the front end of the right upper sidewall and the upper front wall;
(b) a pair of lower panels that cooperate to close the gap between the front end of the right lower sidewall and the lower front wall;
(c) a pair of upper panels that cooperate to close the gap between the front end of the left upper sidewall and the upper front wall;
(d) a pair of lower panels that cooperate to close the gap between the front end of the left lower sidewall and the lower front wall;
(e) a pair of upper panels that cooperate to close the gap between the rear end of the right upper sidewall and the upper rear wall;
a pair of lower panels that cooperate to close the gap between the rear end of the right lower sidewall and the lower rear wall;
(g) a pair of upper panels that cooperate to close the gap between the rear end of the left upper sidewall and the upper rear wall;
(h) a pair of lower panels that cooperate to close the gap between the rear end of the left lower sidewall and the lower rear wall.

13. The hopper insert of claim 12 wherein each of the lower panels depends downwardly from an upper panel and is angled generally towards the center of the hopper.

* * * * *